United States Patent
Ye

(10) Patent No.: US 11,098,840 B2
(45) Date of Patent: Aug. 24, 2021

(54) ROTATING ASSEMBLY AND UNIVERSAL BALL JOINT ASSEMBLY

(71) Applicant: PEGATRON CORPORATION, Taipei (TW)

(72) Inventor: Long-Sing Ye, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 0 days.

(21) Appl. No.: 16/795,350

(22) Filed: Feb. 19, 2020

(65) Prior Publication Data

US 2020/0309312 A1 Oct. 1, 2020

(30) Foreign Application Priority Data

Apr. 1, 2019 (TW) .................................. 108111576

(51) Int. Cl.
*F16M 11/14* (2006.01)
*F16M 11/22* (2006.01)

(52) U.S. Cl.
CPC ............. *F16M 11/14* (2013.01); *F16M 11/22* (2013.01); *F16M 2200/022* (2013.01); *F16M 2200/08* (2013.01)

(58) Field of Classification Search
CPC ............. F16M 2200/022; F16M 11/14; F16M 11/2078; F16M 2200/08; F16C 11/106
See application file for complete search history.

(56) References Cited

U.S. PATENT DOCUMENTS

| | | | | |
|---|---|---|---|---|
| 4,102,585 A | * | 7/1978 | Herbenar | F16C 11/0619 403/138 |
| 6,494,635 B1 | * | 12/2002 | Merlo | F16C 11/106 403/103 |
| 8,087,625 B2 | * | 1/2012 | Chang | F16M 13/022 248/205.5 |
| 8,297,605 B2 | * | 10/2012 | Lee | F41B 5/1449 269/75 |

(Continued)

FOREIGN PATENT DOCUMENTS

| | | |
|---|---|---|
| CN | 206875068 | 1/2018 |
| EP | 0795716 | 9/1997 |
| JP | H10196886 | 7/1998 |

*Primary Examiner* — Bradley Duckworth
(74) *Attorney, Agent, or Firm* — J.C. Patents

(57) ABSTRACT

A rotating assembly is provided and is adapted to be assembled on a foot stand. The rotating assembly includes a limit ring, a base, a spherical friction part, and a pressing module. The limit ring is adapted to be fixed on the foot stand. The base is movably assembled on the limit ring along an axis. The base and the limit ring form a space. The spherical friction part is rotatably disposed in the space between the limit ring and the base. The pressing module is adapted to be fixed on the foot stand. The pressing module is configured on one side of the base along the axis, and pushes the base to a direction of the limit ring to compress the space formed by the base and the limit ring, so that the spherical friction part is in contact with the limit ring and the base. The spherical friction part is temporarily maintained at a specific angle by friction between the spherical friction part and the limit ring and friction between the spherical friction part and the base. A universal ball joint assembly is further provided.

9 Claims, 13 Drawing Sheets

(56) References Cited

U.S. PATENT DOCUMENTS

| | | | |
|---|---|---|---|
| 8,667,843 B2 * | 3/2014 | Johnson | F16C 11/106 |
| | | | 73/579 |
| 9,309,920 B2 * | 4/2016 | Li | G03B 17/561 |
| 9,436,067 B2 * | 9/2016 | Chen | G03B 17/561 |
| 9,940,802 B2 * | 4/2018 | Rosenkvist | G08B 13/19632 |
| 10,038,829 B2 * | 7/2018 | Gilbert | F16M 11/2078 |
| 10,067,409 B2 * | 9/2018 | Elias | F16M 13/02 |
| 10,378,579 B2 * | 8/2019 | Grziwok | F16C 11/06 |
| 10,386,704 B2 * | 8/2019 | Wengreen | F16M 11/22 |
| 10,419,649 B2 * | 9/2019 | Gilbert | G03B 17/561 |
| 10,697,583 B2 * | 6/2020 | Law | F16M 11/041 |
| 10,861,303 B2 * | 12/2020 | Mehdi | F16M 13/02 |
| 2011/0089296 A1 * | 4/2011 | Joanisse | F16M 13/00 |
| | | | 248/181.1 |

* cited by examiner

ROTATING ASSEMBLY AND UNIVERSAL BALL JOINT ASSEMBLY

CROSS-REFERENCE TO RELATED APPLICATIONS

This Non-provisional application claims priority under 35 U.S.C. § 119(a) on Patent Application No(s). TW108111576 filed in Taiwan, Republic of China on Apr. 1, 2019, the entire contents of which are hereby incorporated by reference.

BACKGROUND

Technical Field

The present invention relates to a rotating assembly and a ball joint assembly, and in particular, to a rotating assembly and a universal ball joint assembly.

Related Art

Generally, a foot stand of a common universal ball joint includes a foot stand body, a universal spherical head that is assembled in the foot stand body and can rotate relative to the foot stand body, and a knob used to push the universal spherical head against the foot stand body to temporarily fix the universal sphere head. When the knob is loosened, an object mounted on the universal spherical head can rotate relative to the foot stand body. When the knob is tightened, the object mounted on the universal spherical head can be temporarily fixed at a specific angle. That is, in order to temporarily fix the universal spherical head at the specific angle, currently, the degree of the universal spherical head being pushed in the foot stand body is mainly controlled by a length of a screw into the foot stand body, so that the universal sphere head can be rotated or fixed. However, the foregoing structure has many elements, complexity and poor appearance.

SUMMARY

The present invention provides a rotating assembly which applies a durable universal ball joint assembly with simple appearance.

The present invention provides a universal ball joint assembly which has the foregoing advantages.

The rotating assembly of the present invention is adapted to be assembled on a foot stand. The rotating assembly includes a limit ring, a base, a spherical friction part, and a pressing module. The limit ring is adapted to be fixed on the foot stand. The base is assembled on the limit ring and capable of moving along an axis. The base and the limit ring form a space. The spherical friction part is rotatably disposed in the space between the limit ring and the base. The pressing module is adapted to be fixed on the foot stand. The pressing module is assembled on one side of the base along the axis, and pushes the base to a direction of the limit ring to compress the space formed by the base and the limit ring so the spherical friction part is in contact with the limit ring and the base to generate friction. The spherical friction part temporarily maintains at a specific angle due to the friction between the spherical friction part and the limit ring and the friction between the spherical friction part and the base.

In an embodiment of the present invention, the pressing module includes a pressing part and an elastic part. The pressing part is adapted to be fixed on the foot stand. The base is located between the pressing part and the spherical friction part. The elastic part is disposed between the base and the pressing part.

In an embodiment of the present invention, the foot stand includes a tube body and a plurality of first engaging portions protruding from an inner wall of the tube body. There is a plurality of notches among the first engaging portions. The pressing part further includes a baseplate and a plurality of second engaging portions disposed on a partial outer edge of the baseplate. The pressing part is limited by the first engaging portions after the second engaging portions passes through the notches and rotates an angle, and therefore the pressing part is fixed on the foot stand.

In an embodiment of the present invention, the second engaging portions protrude from the baseplate and the elastic part is located in a space formed by the baseplate and the second engaging portions In an embodiment of the present invention, the pressing part has an external thread. The foot stand has an internal thread corresponding to the external thread. The pressing part is adjustably fixed on the foot stand.

In an embodiment of the present invention, the rotating assembly further includes an assembly part. The assembly part is fixed on the spherical friction part and goes through the limit ring.

In an embodiment of the present invention, the spherical friction part includes a sphere head and a contact layer wrapping the sphere head. The contact layer is in contact with the limit ring and the base.

In an embodiment of the present invention, the contact layer includes a plurality of ribs or a plurality of bumps that protrude from an outer surface of the contact layer and are uniformly distributed.

The universal ball joint assembly of the present invention includes a foot stand and the foregoing rotating assembly. The limit ring and the pressing module of the rotating assembly are fixed on the foot stand.

In an embodiment of the present invention, the foot stand includes a lower pedestal, an upper pedestal, a first magnetic piece, and a second magnetic piece corresponding to the first magnetic piece. The first magnetic piece is disposed on the upper pedestal. The second magnetic piece is disposed on the lower pedestal. The upper pedestal is detachably assembled on the lower pedestal by the first magnetic piece and the second magnetic piece.

In an embodiment of the present invention, the foot stand includes a lower pedestal and an upper pedestal. The lower pedestal includes a first fastening portion. The upper pedestal includes a second fastening portion corresponding to the first fastening portion, and the upper pedestal is detachably assembled on the lower pedestal by the first fastening portion and the second fastening portion.

Based on the above, in the universal ball joint assembly of the present invention, the limit ring and the pressing module of the rotating assembly are respectively limited in the foot stand. The base is movably assembled with the limit ring, and a rotatable spherical friction part is disposed between the limit ring and the base. One side of the base is configured with a pressing module, and the base may be pushed to the direction of the limit ring by the pressing module, so that the spherical friction part is in contact with an inner wall of the limit ring and an inner wall of the base, thereby providing friction between the spherical friction part and the limit ring and friction between the spherical friction part and the base. Therefore, an object connected to the spherical friction part can be temporarily fixed at the specific angle by the friction between the spherical friction part and the limit ring and the friction between the spherical friction part and the base. When the object needs to rotate, a user only needs to apply a force to overcome the foregoing friction, so that the spherical friction part can rotate relative to the limit ring and the base.

To make the above features and advantages of the present invention more obvious and easy to understand, the following embodiments are given and illustrated in detail with the accompanying drawings.

DETAILED DESCRIPTION

Figure 1:
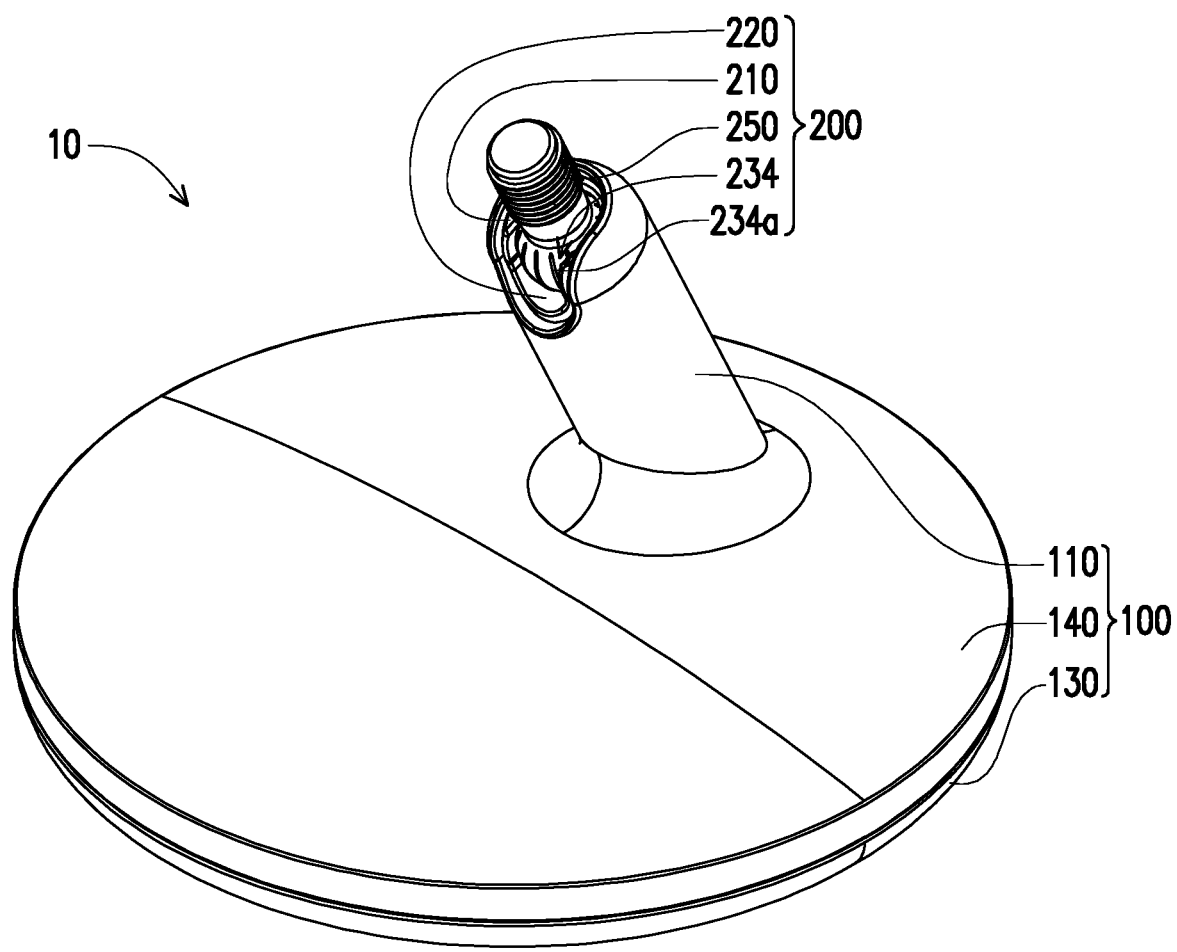
FIG. 1 is a schematic three-dimensional view of a universal ball joint assembly according to an embodiment of the present invention.
Figure 2:
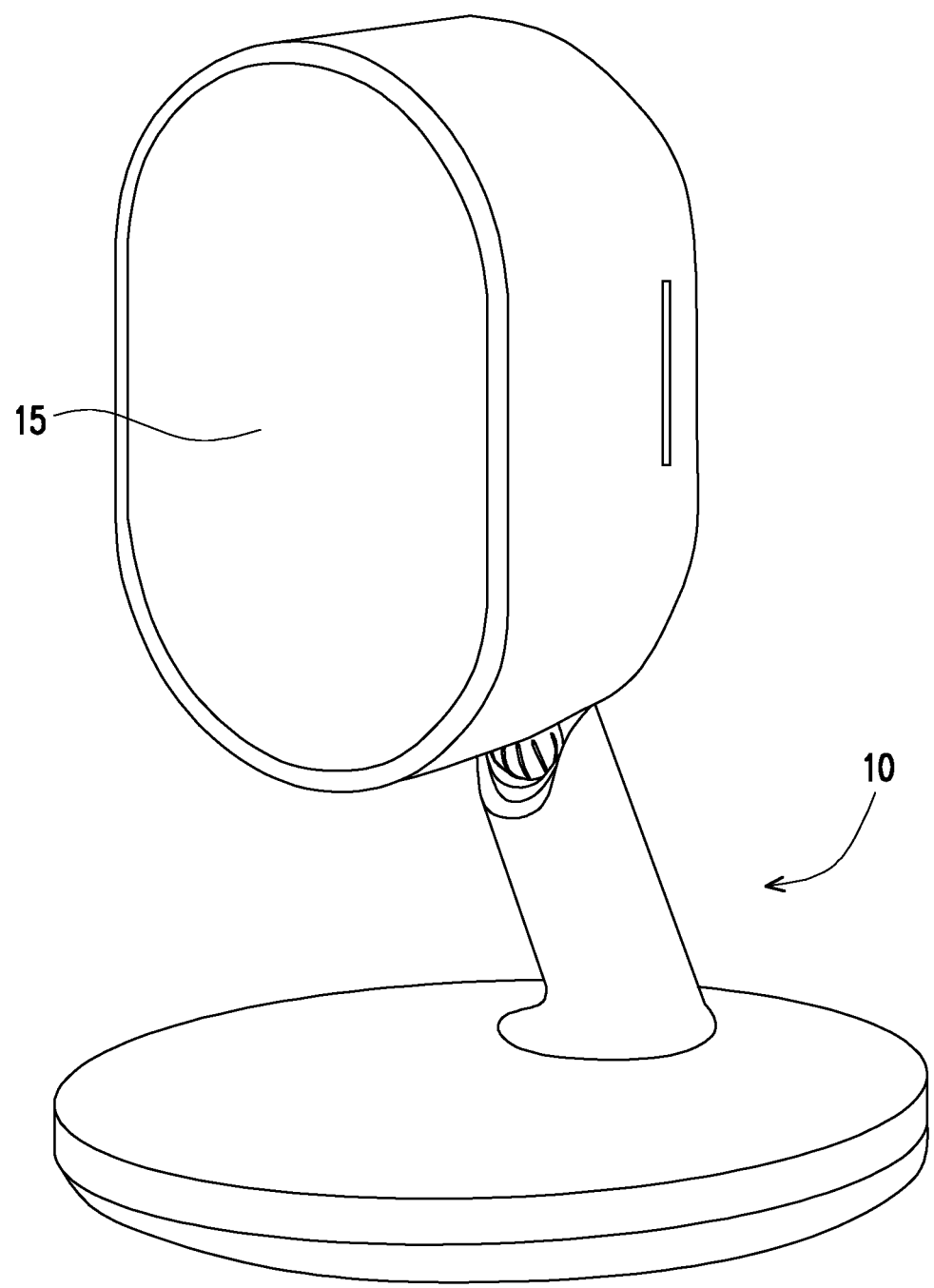
FIG. 2 is a schematic three-dimensional view of an object assembled on the universal ball joint assembly of FIG. 1.

FIG. 1 is a schematic three-dimensional view of a universal ball joint assembly according to an embodiment of the present invention. FIG. 2 is a schematic three-dimensional view of an object assembled on the universal ball joint assembly of FIG. 1. Referring to FIG. 1 and FIG. 2, in this embodiment, an object 15 (as shown in FIG. 2) is rotatably disposed on a universal ball joint assembly 10. The universal ball joint assembly 10 includes a foot stand 100 and a rotating assembly 200 disposed on the foot stand 100. Specifically, in this embodiment, the object 15 is rotatably assembled on the rotating assembly 200, and the object 15 can temporarily maintains at a specific angle relative to the foot stand 100 because of the rotating assembly 200.

It should be noted that the object 15 shown in FIG. 2 is merely used as an example. The present invention does not limit the type, form and size of the object 15. Therefore, any object 15 that is required to be temporarily fixed at a specific angle relative to the foot stand 100 and to be rotated any angle by force, such as a camera, a clock, a mirror, a mobile phone holder or a camera holder, may be applicable to the universal ball joint assembly 10 in the present invention. Therefore, the universal ball joint assembly 10 may have other appropriate designs according to practical requirements, and the present invention is not limited thereto.

Figure 3:
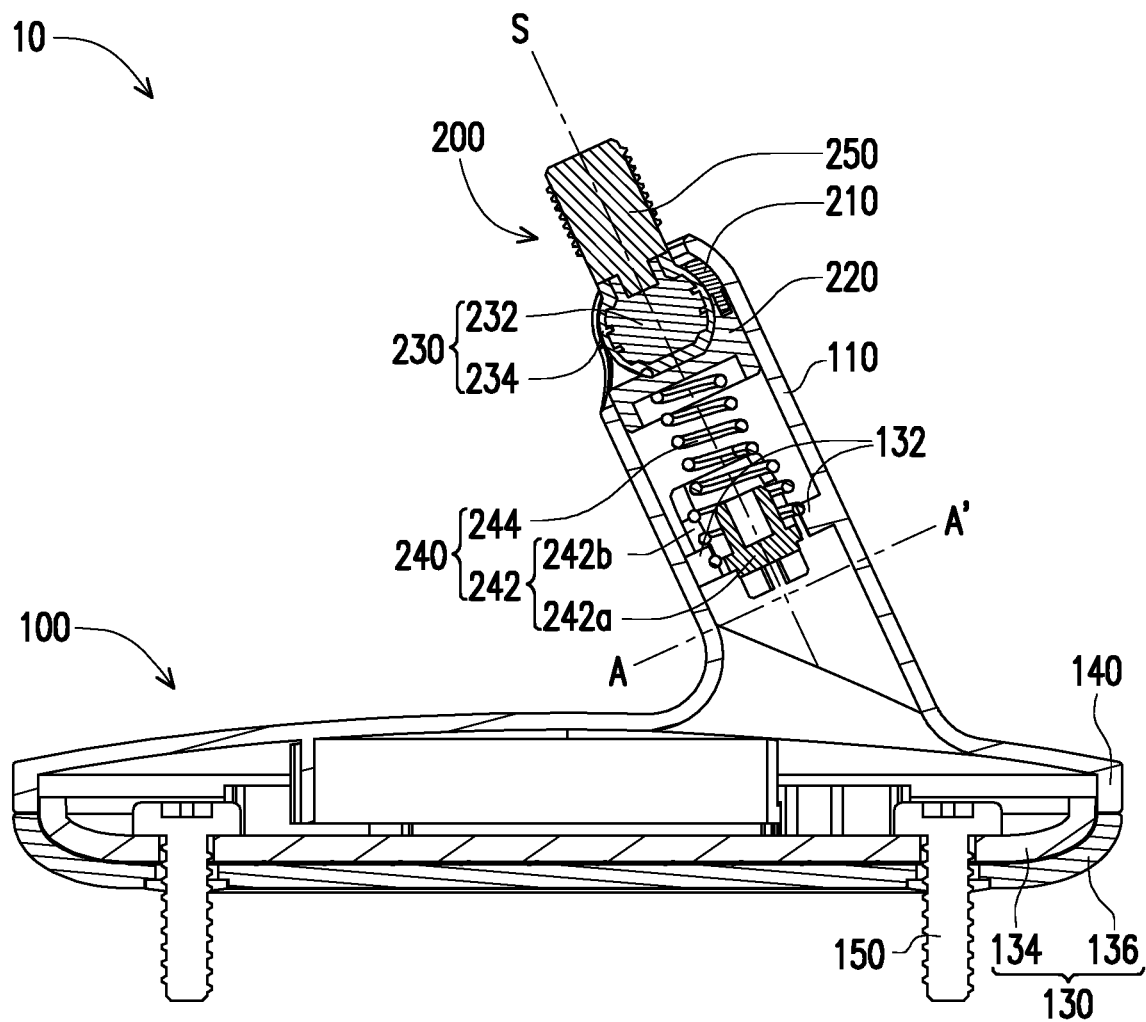
FIG. 3 is a schematic cross-sectional view of the universal ball joint assembly of FIG. 1.
Figure 4:
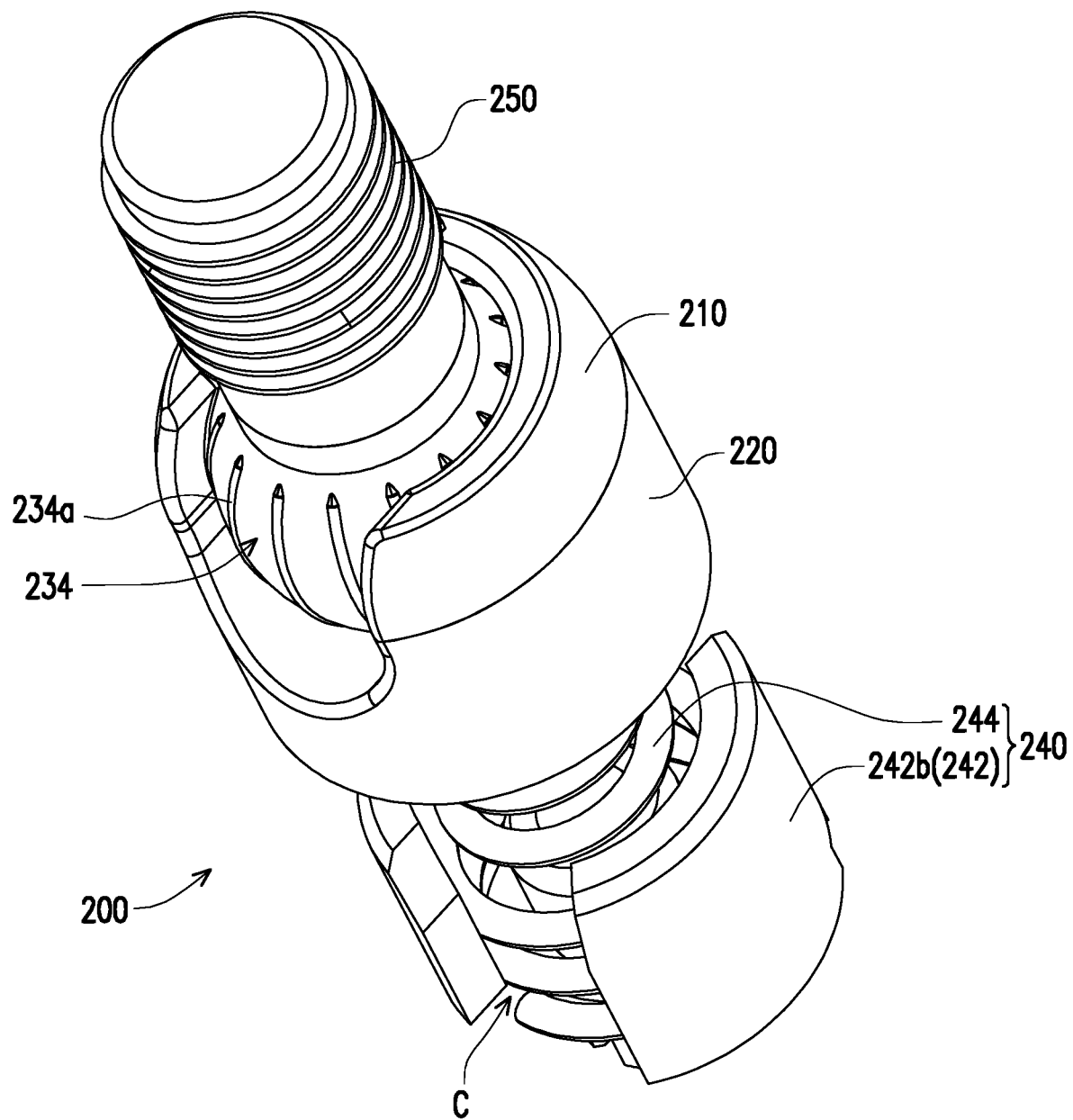
FIG. 4 is a schematic three-dimensional view of a rotating assembly of the universal ball joint assembly of FIG. 1.
Figure 5:
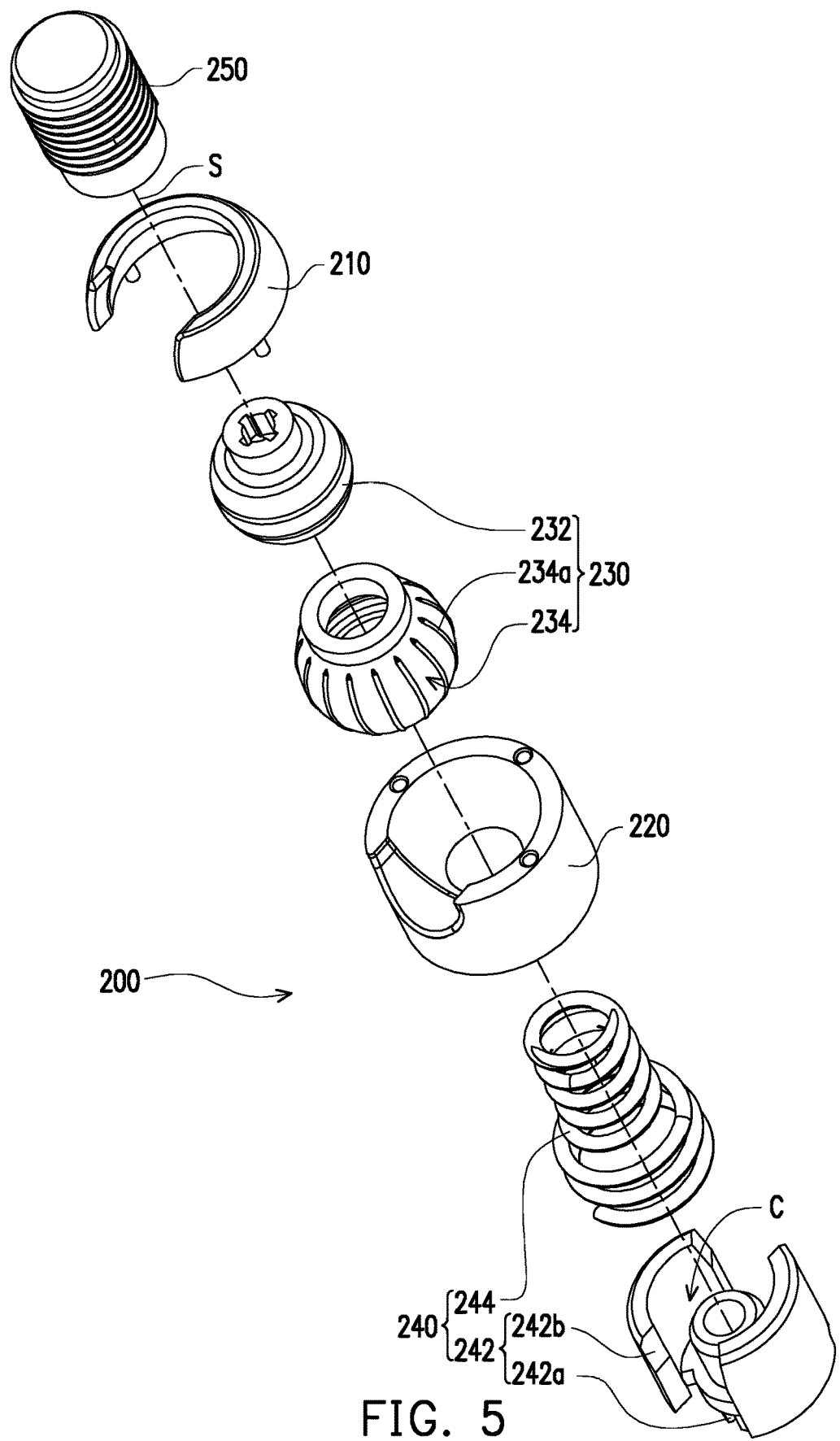
FIG. 5 is a schematic exploded view of the rotating assembly of FIG. 4.

FIG. 3 is a schematic cross-sectional view of the universal ball joint assembly of FIG. 1. FIG. 4 is a schematic three-dimensional view of a rotating assembly of the universal ball joint assembly of FIG. 1. FIG. 5 is a schematic exploded view of the rotating assembly of FIG. 4. Referring to FIG. 1 to FIG. 5, in this embodiment, the foot stand 100 optionally includes a tube body 110. The rotating assembly 200 is assembled in the tube body 110 of the foot stand 100. Furthermore, the rotating assembly 200 includes a limit ring 210, a base 220, a spherical friction part 230, and a pressing module 240.

In this embodiment, as shown in FIG. 5, the base 220 is assembled on the limit ring 210 and capable of moving along an axis S. The base 220 and the limit ring 210 form a space and the spherical friction part 230 is rotatably disposed in the space between the limit ring 210 and the base 220. The pressing module 240 is disposed on one side of the base 220 relative to the spherical friction part 230 along the axis S, and the base 220 is located between the pressing module 240 and the spherical friction part 230. In the embodiments of the present invention, a diameter of the spherical friction part 230 may be slightly greater than the space formed by the limit ring 210 and the base 220, and the material of the limit ring 210 and/or the base 220 is compressible. Therefore, when the pressing module 240 pushes the base 220, the space formed by the limit ring 210 and the base 220 is reduced due to compression. In addition, as shown in FIG. 3, the limit ring 210 and the pressing module 240 are fixed on the tube body 110 of the foot stand 100. Definitely, in another embodiment, the rotating assembly 200 may not be disposed in the tube body 110, and could be disposed in an appropriate position on the foot stand 100 according to practical requirements.

In addition, in this embodiment, as shown in FIG. 5, the pressing module 240 optionally includes a pressing part 242 and an elastic part 244. The base 220 is located between the pressing part 242 and the spherical friction part 230, and the elastic part 244 is disposed between the base 220 and the pressing part 242. In other words, the elastic part 244 is located at one side of the base 220 relative to the spherical friction part 230. In addition, the elastic part 244 in this embodiment is, for example, a spring, but is not limited thereto. In this embodiment, the pressing part 242 is fixed on the foot stand 100. Therefore, the elastic part 244 stores an elastic force when being pressed by the pressing part 242, to push the base 220 to a direction of the limit ring 210 to compressed the space between the base 220 and the limit ring 210 so that the spherical friction part 230 is in contact with the limit ring 210 and the base 220 to generate friction.

In this way, the spherical friction part 230 temporarily maintains at a specific angle due to the friction between the spherical friction part 230 and the limit ring 210 and the friction between the spherical friction part 230 and the base 220. Therefore, the object 15 can be fixed at the specific angle relative to the foot stand 100 by the spherical friction part 230. If it is intended to rotate the object 15 a force may be applied to overcome the maximum static friction between the spherical friction part 230 and the limit ring 210, and between the spherical friction part 230 and the base 220. In this case the spherical friction part 230 can rotate relative to the foot stand 100.

It is worth mentioning that, in this embodiment, because the pressing part 242 and the elastic part 244 are separate, a user or a manufacturer can replace the elastic part 244 with different elasticity coefficients to change the elasticity of the elastic part 244 against the base 220. Therefore, by adjusting a value of the friction between the spherical friction part 230 and the limit ring 210, and between the spherical friction part 230 and the base 220, different textures between the spherical friction part 230 and the foot stand 100 can be provided during the rotation.

It should be noted that, firstly, in an unillustrated embodiment, a design of the pressing module may be integrally formed, and the pressing module of a single piece presses the base 220. Alternatively, in another unillustrated embodiment, even if the pressing module is not integral the pressing module is not necessary to be a spring-actuated assembly and may be any actuated assembly in an appropriate form. For example, the elastic part may also be, for example, metal shrapnel. The present invention does not limit the form, material and shape of the pressing module.

Referring to FIG. 2, FIG. 4 and FIG. 5, in this embodiment, the rotating assembly 200 optionally includes an assembly part 250 fixed on the spherical friction part 230 and going through the limit ring 210. The object 15 is assembled on the assembly part 250 in this embodiment, but the present invention is not limited thereto. In addition, in this embodiment, the spherical friction part 230 includes a sphere head 232 and a contact layer 234 wrapping the sphere head 232. The spherical friction part 230 may be in contact with an inner wall of the limit ring 210 and an inner wall of the base 220 through the contact layer 234.

In this embodiment, the material of the sphere head 232 is, for example, rather hard plastic. The material of the contact layer 234 is a composite material of rubber and Teflon, and the contact layer 234 has low friction and is compressible. Definitely, in another embodiment, the sphere head 232 may be metal, and the material of the contact layer 234 may be silicone rubber, foam, or other appropriate materials according to practical requirements. The present invention does not limit the material of the sphere head 232 and the contact layer 234.

It is worth mentioning that, in an embodiment, an outer surface of the contact layer may be a perfect sphere. However, due to manufacturing tolerances, it may be difficult for the outer surface of the contact layer to be a perfect sphere. For example, one side of the outer surface of the contact layer is more convex, which may cause that the spherical friction part has a problem rotating at some positions with greater resistance while the spherical friction part is rotating relative to the limit ring 210 and the base 22.

To solve the foregoing problems, in this embodiment, the contact layer 234 includes one or more bearing ribs 234a that protrude from the outer surface and are uniformly distributed. In this embodiment, when the spherical friction part 230 is in contact with the limit ring 210 and the base 220 the bearing ribs 234a may touch the inner wall of the limit ring 210 and the inner wall of the base 220, before the contact layer 234 without the bearing ribs 234a does. Because the bearing ribs 234a are uniformly distributed on the outer surface of the contact layer 234, and the height of the bearing ribs 234a protruding from the outer surface may be greater than the manufacturing tolerances, even if t the contact layer 234 protrudes in some unexpected areas due to the manufacturing tolerances cause, the spherical friction part 230 can rotate smoothly.

Based on such design, the bearing ribs 234a have an effect of improving the user's experience during the rotation. Furthermore, the uniformly distributed bearing ribs 234a of the spherical friction part 230 allow the user to have the same hand texture, no matter what angle the object 15 turns to, without having a feeling of getting stuck or the resistance changed when the object 15 is rotated to a certain angle.

It should be noted that, in this embodiment, the bearing ribs 234a illustrated on the outer surface of the contact layer 234 in FIG. 5 are bars. However, in another embodiment, bumps in any shapes may also be uniformly distributed on the spherical friction part 230. That is, the bearing ribs 234a and the bumps may be designed in any appropriate form according to practical requirements as long as uniformly distributed bumps are provided on the contact layer 234 of the spherical friction part 230. The present invention does not limit the shape, size and material of the bearing ribs 234a and the bumps.

In addition, referring to FIG. 4 and FIG. 5, in this embodiment, the sphere head 232 and the contact layer 234 are formed, for example, by double injection. Referring to FIG. 3 and FIG. 5, in this embodiment, first, a periphery of the sphere head 232 has grooves so that the contact layer 234 of the spherical friction part 230 formed via injection molding is engaged with the sphere head 232. Definitely, the present invention does not limit the form of the grooves of the sphere head 232 as long as the grooves of the sphere head 232 is engaged with a grain of the contact layer 234.

In addition, in this embodiment, the material of the assembly part 250 is, for example, metal. The assembly part 250, for example, is fixed on the spherical friction part 230 by means of injection molding on the sphere head 232 so that the assembly part 250, the sphere head 232, and the contact layer 234 are not a detachable design. Definitely, in another embodiment, the sphere head 232, the spherical friction part 230 and the assembly part 250 may be fixed by means of locking, engaging, and adhering, and may further be a detachable design. The present invention does not limit the forming manner, fixing manner, and material of the spherical friction part 230 and the assembly part 250.

Figure 6:
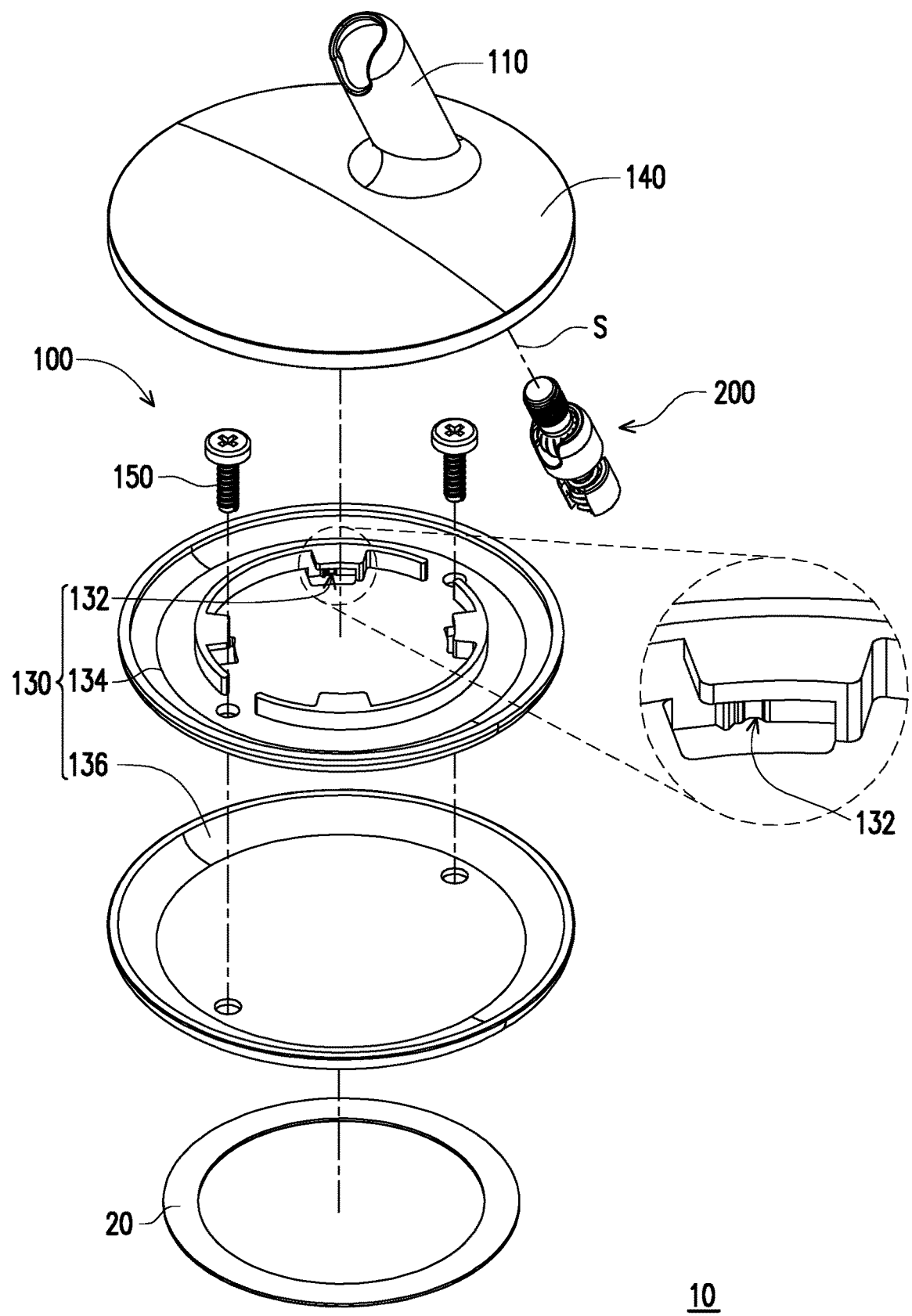
FIG. 6 is a schematic exploded view of a foot stand of the universal ball joint assembly of FIG. 1.
Figure 7:
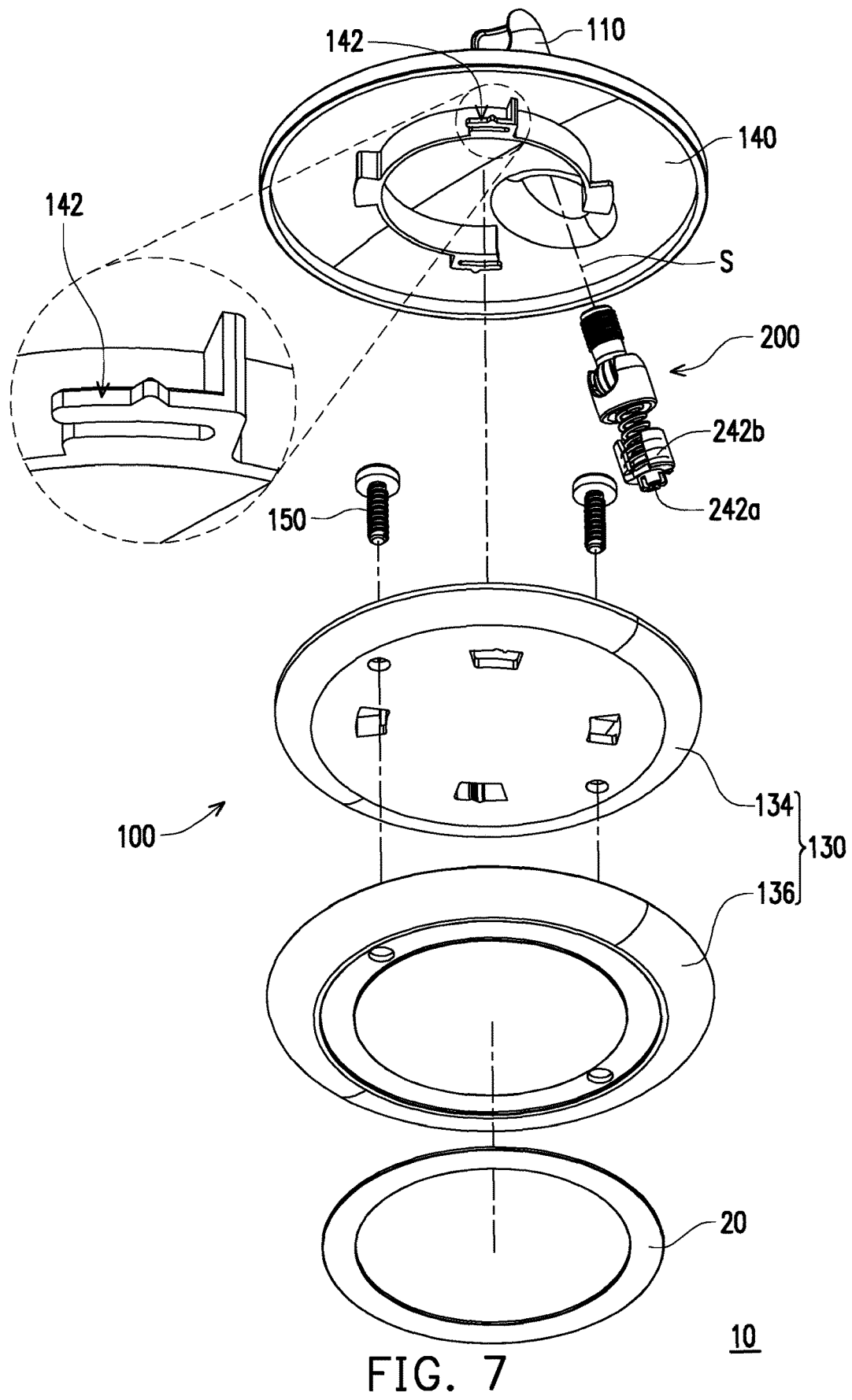
FIG. 7 is a schematic exploded view of a foot stand of the universal ball joint assembly of FIG. 1 at another angle of view.
Figure 8:
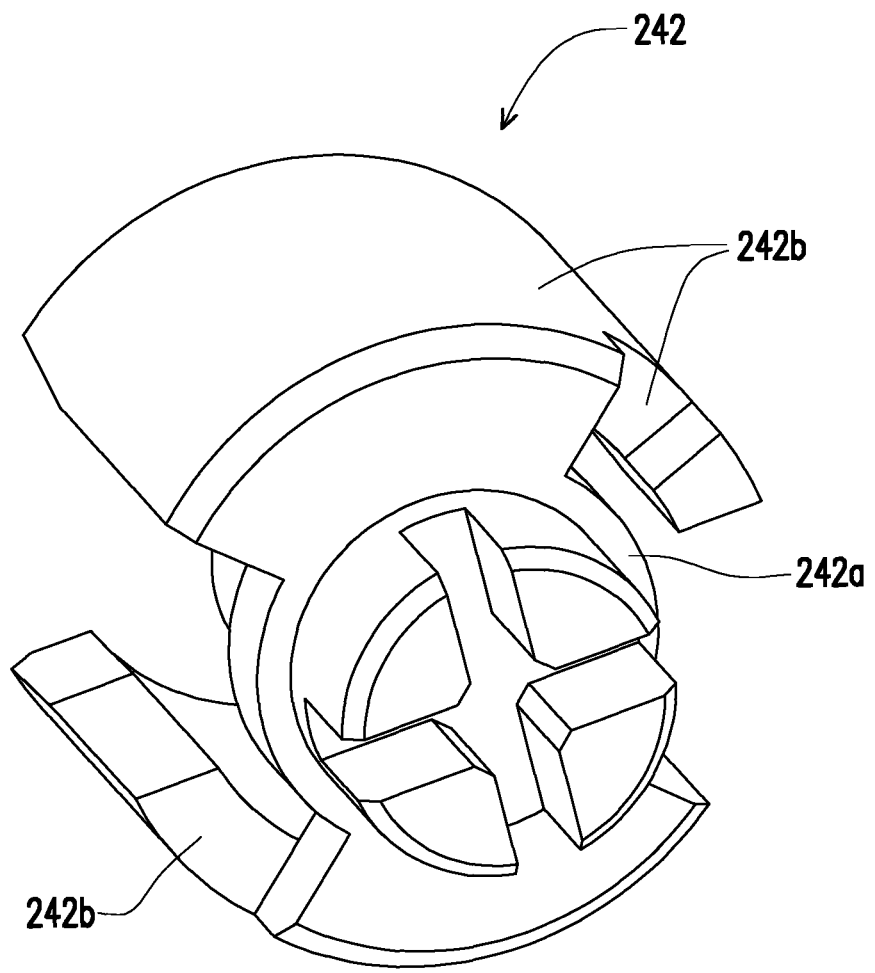
FIG. 8 is a schematic three-dimensional view of a pressing part of the rotating assembly of FIG. 6.
Figure 9:
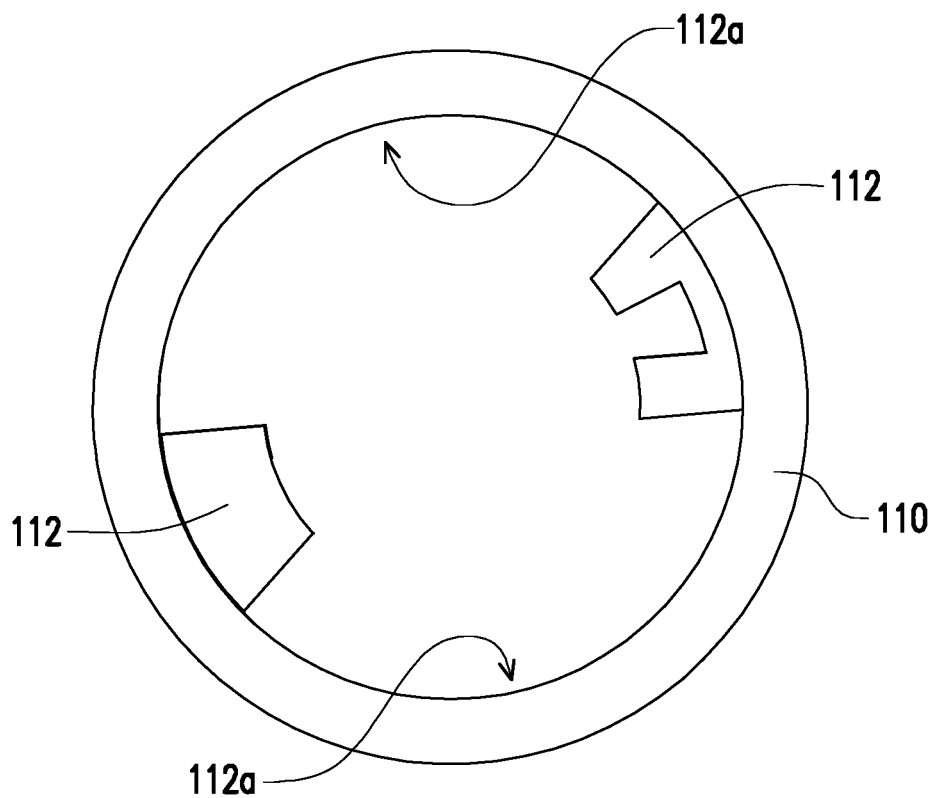
FIG. 9 is a schematic bottom cross-sectional view of a foot stand of the universal ball joint assembly of FIG. 1 along a sectional line A-A' of FIG. 3.

FIG. 6 is a schematic exploded view of a foot stand of the universal ball joint assembly of FIG. 1. FIG. 7 is a schematic exploded view of a foot stand of the universal ball joint assembly of FIG. 1 at another angle of view. FIG. 8 is a schematic three-dimensional view of a pressing part of the rotating assembly of FIG. 6. FIG. 9 is a schematic bottom cross-sectional view of a foot stand of the universal ball joint assembly of FIG. 1 along a sectional line A-A' of FIG. 3.

Referring to FIG. 6 to FIG. 9, in this embodiment, as shown in FIG. 9, the foot stand 100 includes a plurality of first engaging portions 112 protruding from an inner wall of a tube body 110. There exists a plurality of notches 112a among the first engaging portions 112. In addition, as shown in FIG. 8, the pressing part 242 includes a baseplate 242a and a plurality of second engaging portions 242b disposed on a local outer edge of the baseplate 242a. When it is intended that the pressing part 242 is assembled on the inner wall of the tube body 110, the user may first pass the second engaging portions 242b of the pressing part 242 through the notches 112a, and then rotate the pressing part 242 an angle to have the second engaging portions 242b limited by the first engaging portions 112, and therefore the pressing part is fixed on the foot stand 100.

It should be noted that, in this embodiment, the examples in FIG. 8 and FIG. 9 are illustrated as follows: two first engaging portions 112, two notches 112a, and two second engaging portions 242b. Definitely, the present invention does not limit the quantity and form of the first engaging portions 112, the notches 112a, and the second engaging portions 242b as long as the pressing part 242 can be fixed on the foot stand 100.

In addition, referring to FIG. 5 again, to locate the elastic part 244 between the pressing part 242 and the base 220, in this embodiment, the second engaging portions 242b protrude from the baseplate 242a to form a space C. The elastic part 244 is located in the space C surrounded by the baseplate 242a and the second engaging portions 242b and may be firmly disposed between the pressing part 242 and the base 220. In other words, in this embodiment, besides the function of being fixed on the tube body 110, the second engaging portion 242b may further be used to position the elastic part 244.

In addition, referring to FIG. 6 and FIG. 7, in this embodiment, the foot stand 100 includes a lower pedestal 130 and an upper pedestal 140. Specifically, the lower pedestal 130 includes a first fastening portion 132 (as shown in FIG. 6), and the upper pedestal 140 includes a second fastening portion 142 (as shown in FIG. 7) corresponding to the first fastening portion 132. The upper pedestal 140 is detachably assembled on the lower pedestal 130 by the first fastening portion 132 and the second fastening portion 142.

In addition, as shown in FIG. 6 and FIG. 7, in this embodiment, the lower pedestal 130 further includes an inner weight disk 134 and an outer bottom cover 136 fixed on the inner weight disk 134. A material density of the inner weight disk 134 is greater than a material density of the outer bottom cover 136, and the inner weight disk 134 is used to provide most of the weight of the lower pedestal 130 so the foot stand 100 is not easy to tip. In this embodiment, the outer bottom cover 136 and the upper pedestal 140 are made of the same material. The material of the outer bottom cover 136 and the upper pedestal 140, for example, may be plastic that has advantages of aesthetic and easy to form and lower costs. Therefore, the appearance of the foot stand 100 can be consistent.

Definitely, the present invention does not limit the form of the lower pedestal 130, the material of the inner weight disk 134, the outer bottom cover 136, and the upper pedestal 140. Moreover, in an unillustrated embodiment, the inner weight disk and the outer bottom cover may further be applied to other forms of foot stand.

In addition, as shown in FIG. 6 and FIG. 7, in this embodiment, the lower pedestal 130 is optionally provided with a foot pad 20. Therefore, when the universal ball joint assembly 10 is placed on, for example, a table, a buffering effect and friction can be provided between the lower pedestal 130 and the table, so that the foot stand 100 can be placed on the table more securely and firmly. Definitely, the foot pad 20 is an optional component according to practical requirements, and the present invention is not limited thereto.

Referring to FIG. 2 and FIG. 5 again, in these embodiments, the foot stand 100 further includes a screwing part 150, and the screwing part 150 is optionally used to fix the lower pedestal 130 on a wall surface (which is not shown). Therefore, for example, when a user wants to place the universal ball joint assembly 10 and the object 15 on a wall surface, for example, a wall perpendicular to the ground, the user may first fasten the lower pedestal 130 on the wall by the screwing part 150, and then assemble the upper pedestal 140 on the lower pedestal 130. In this way, the user can dispose the universal ball joint assembly 10 and the object 15 on the wall. Definitely, in another embodiment, the universal ball joint assembly 10 may be placed or fixed on any appropriate position according to practical requirements. The present invention does not limit the placing manner of the universal ball joint assembly 10.

It should be noted that, in these embodiments, the screwing part 150 is shown as, for example, two screws, and the lower pedestal 130 is fastened to an appropriate wall surface by means of screwing. Definitely, in another embodiment, other appropriate fixed manners such as adhesion and magnetic suction can also be used, and the present invention is not limited thereto.

In this embodiment, when the user wants to place the universal ball joint assembly 10 and the object 15 on the table, for example, in a direction shown in FIG. 2, the user only needs to assemble the upper pedestal 140 and the lower pedestal 130 by using the first fastening portion 132 and the second fastening portion 142, and thus the screwing part 150 is not needed. That is, in this embodiment, the screwing part 150 is an optional component according to practical requirements.

Other embodiments are listed below for illustration. It should be noted herein that the following embodiments use the element numbers and some content of the foregoing embodiment, where the same number is used to represent the same or similar element so the same technical descriptions of the content is omitted. Basically, the distinguishable features in each embodiment may be applied to other embodiments. For the description of omissions, reference may be made to the foregoing embodiment, which shall not be repeated below.

Figure 10:
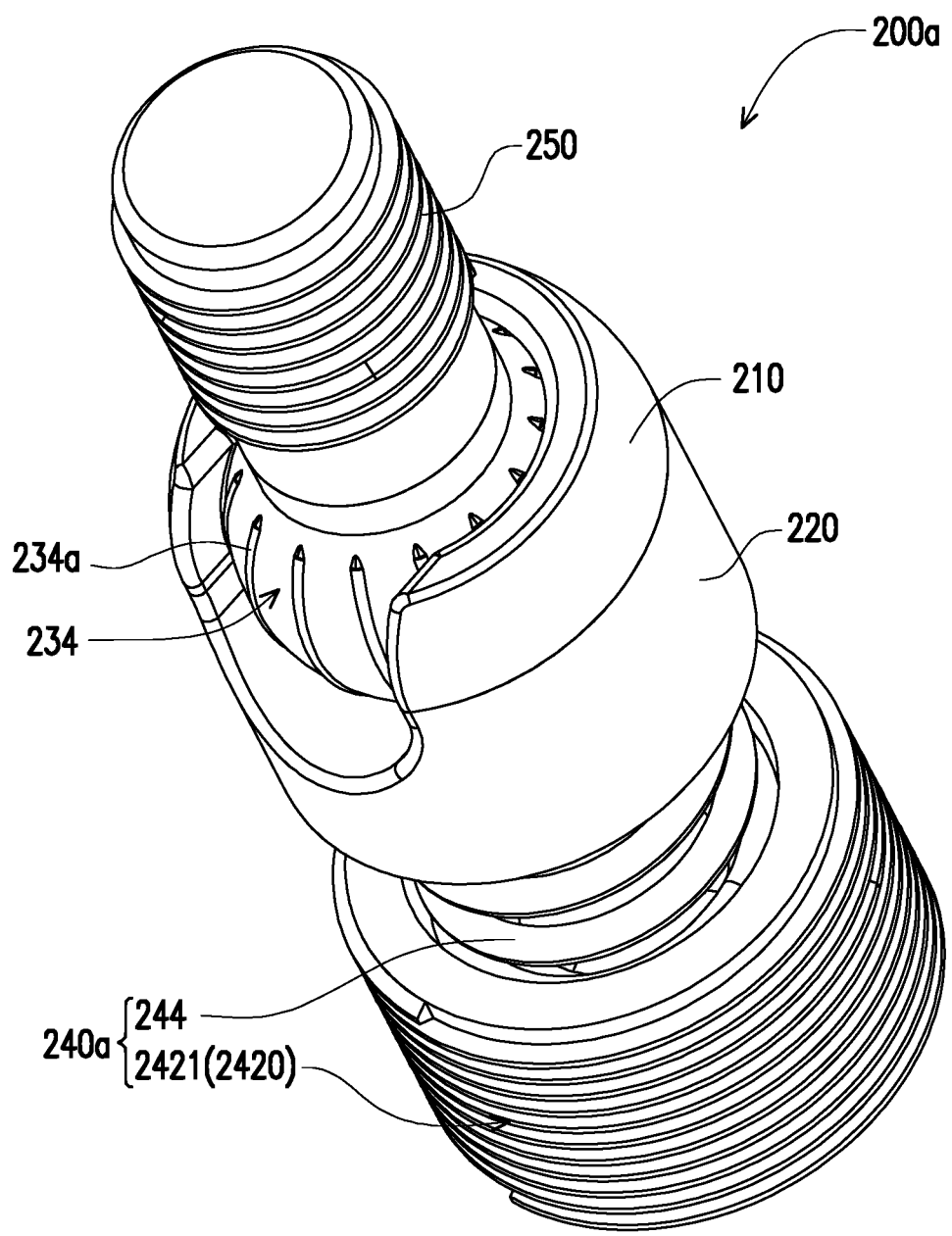
FIG. 10 is a schematic three-dimensional view of a rotating assembly of a universal ball joint assembly according to another embodiment of the present invention.
Figure 11:
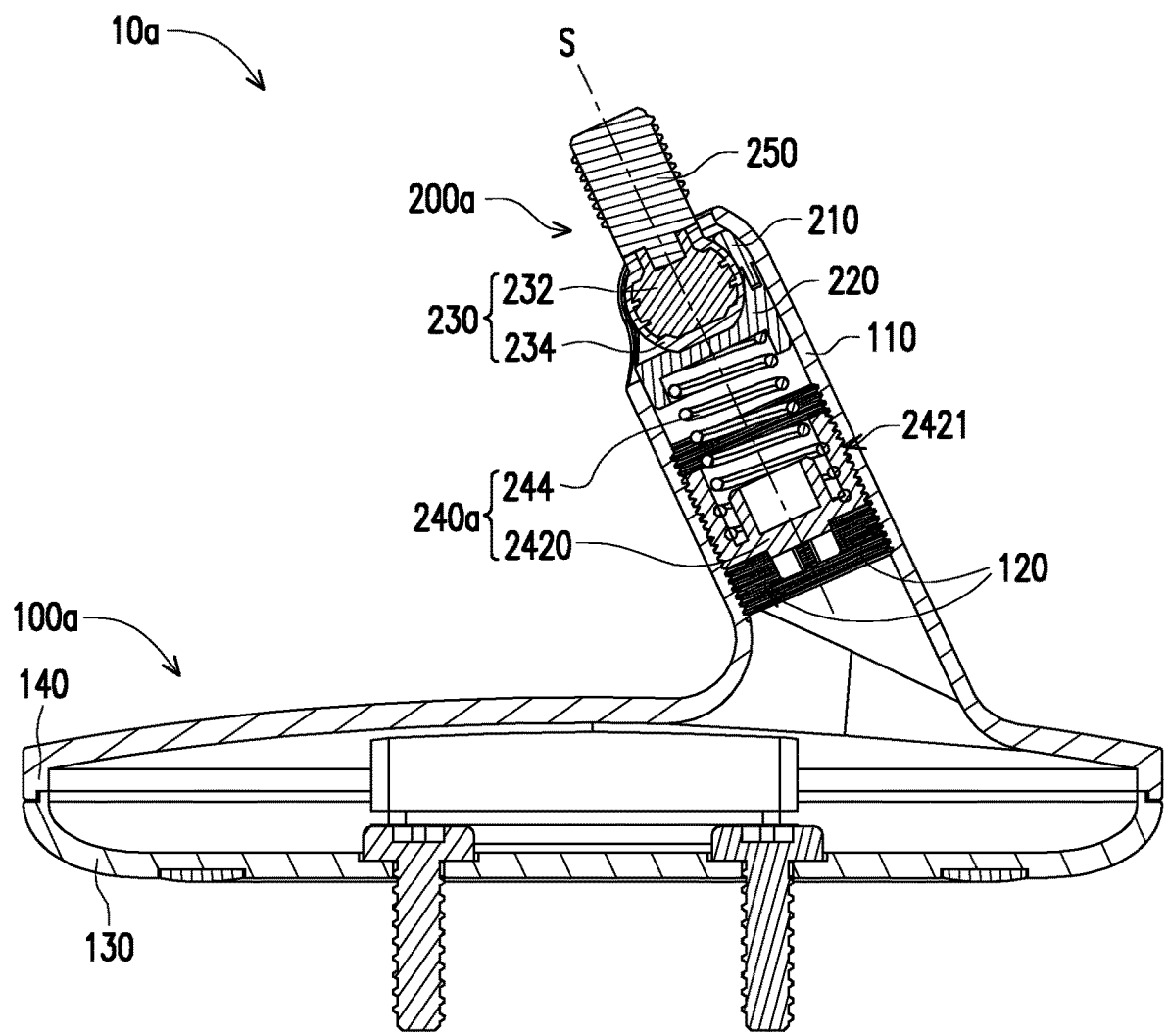
FIG. 11 is a schematic cross-sectional view of the universal ball joint assembly of FIG. 10.
Figure 12:
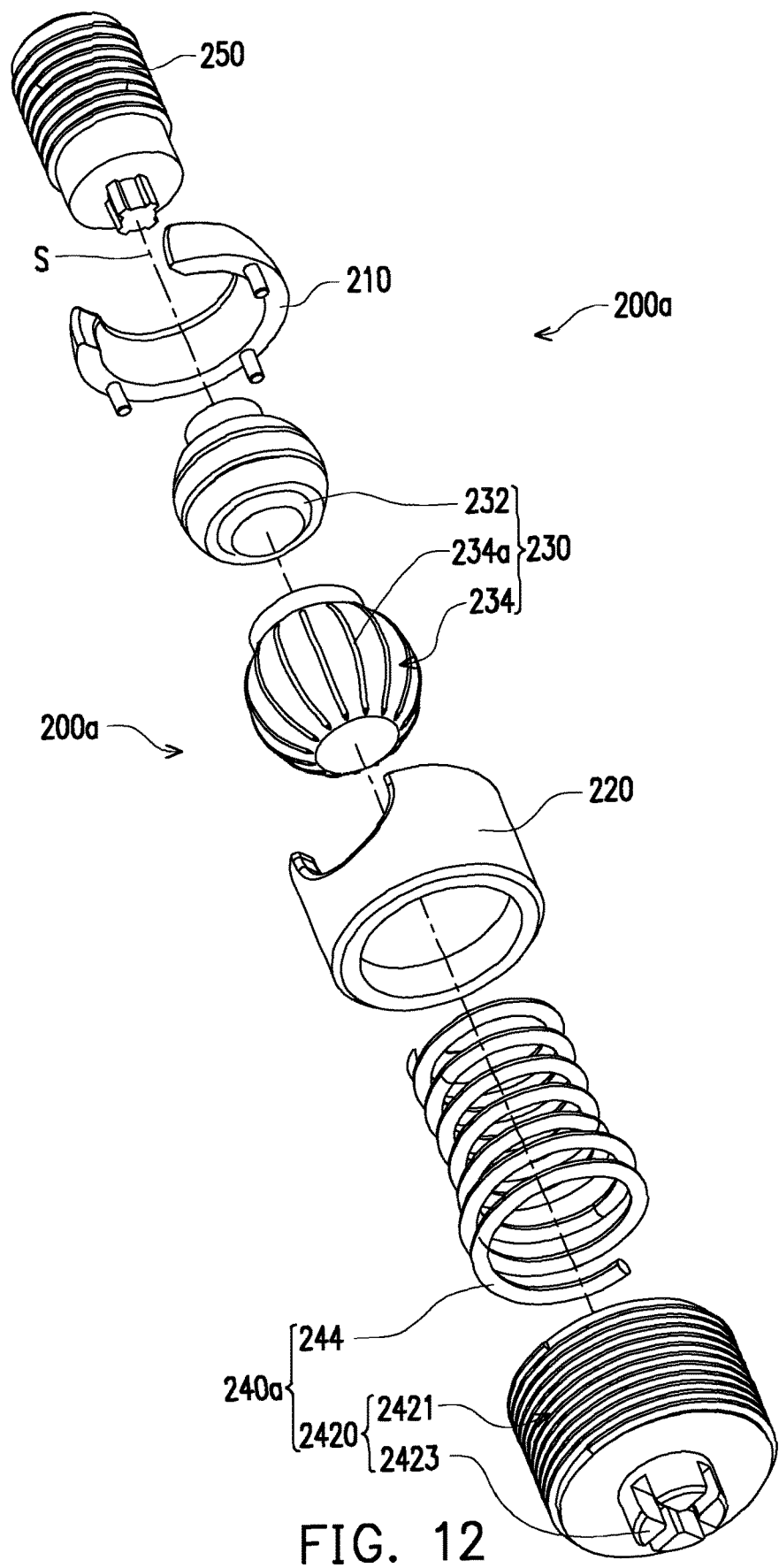
FIG. 12 is a schematic exploded view of the rotating assembly of FIG. 10.

FIG. 10 is a schematic three-dimensional view of a rotating assembly of a universal ball joint assembly according to another embodiment of the present invention. FIG. 11 is a schematic cross-sectional view of the universal ball joint assembly of FIG. 10. FIG. 12 is a schematic exploded view of the rotating assembly of FIG. 10. Referring to FIG. 10 to FIG. 12, a main difference between a universal ball joint assembly 10a and the universal ball joint assembly 10 in the foregoing embodiment is that, in this embodiment, a pressing part 2420 of a pressing module 240a has an external thread 2421, and a foot stand 100a has an internal thread 120 corresponding to the external thread 2421. The pressing part 242 is adjustably fixed on the foot stand 100a by the corresponding internal thread 120 and external thread 2421. That is, the rotating assembly 200a in this embodiment is fixed on the foot stand 100a in a screwing attachment manner.

As shown in FIG. 11 and FIG. 12, the pressing part 2420 is provided with a drive 2423. The drive 2423 of the pressing part 2420, for example, is a cross screw hole. Therefore, a cross screwdriver may be used to rotate the drive 2423 to adjust the position of the pressing part 2420 fixed on the foot stand 100a. In this way, the user can adjust the strength of the pressing part 2420 pressing the elastic part 244 to change the elastic force of the elastic part 244 against the base 220 by adjusting the position of the pressing part 2420, thereby adjusting the frictions between the spherical friction part 230 and the limit ring 210 and between the spherical friction part 230 and the base 220. Thus, the spherical friction part 230 and the foot stand 100a have various hand textures.

Figure 13:
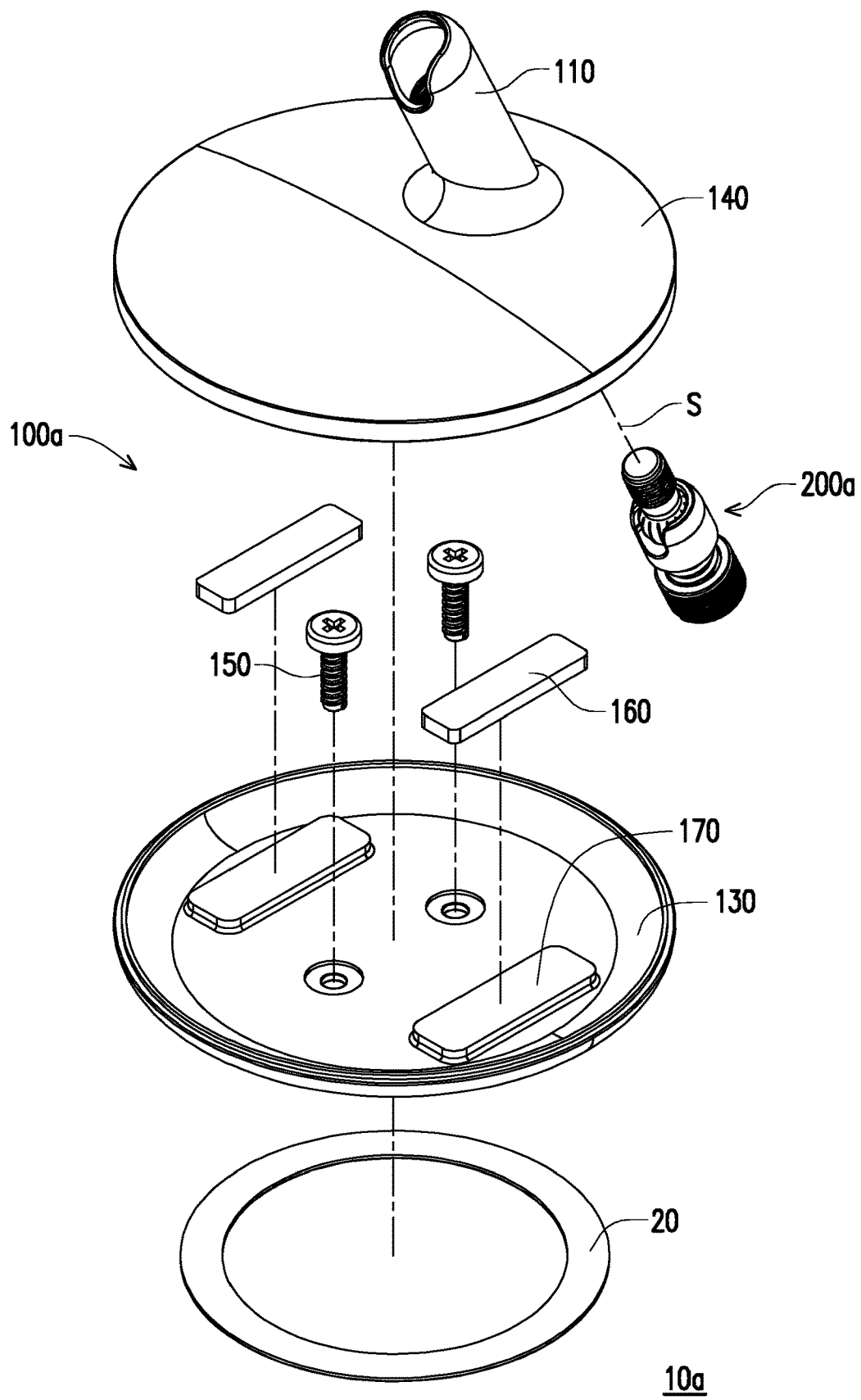
FIG. 13 is a schematic exploded view of a foot stand of the universal ball joint assembly of FIG. 10.

FIG. 13 is a schematic exploded view of a foot stand of the universal ball joint assembly of FIG. 10. Referring to FIG. 13, in this embodiment, the foot stand 100a includes a lower pedestal 130, an upper pedestal 140, at least one first magnetic piece 160, and at least one second magnetic piece 170 corresponding to the first magnetic piece 160.

Specifically, the first magnetic piece 160 is disposed on the upper pedestal 140, and the second magnetic piece 170 is disposed on the lower pedestal 130. The upper pedestal 140 is detachably assembled on the lower pedestal 130 through the first magnetic piece 160 and the second magnetic piece 170.

It should be noted that, in this embodiment, the first magnetic piece 160 is a magnet, for example, a neodymium iron boron strong magnet, but is not limited thereto. The second magnetic piece 170 is a non-magnetic metal piece. Definitely, in another embodiment, the first magnetic piece 160 and the second magnetic piece 170 may also be two magnets that have opposite magnetic properties and can attract each other. Alternatively, the first magnetic piece 160 is a non-magnetic metal piece, and the second magnetic piece 170 is a magnet. The present invention does not limit the quantity, material and form of the first magnetic piece 160 and the second magnetic piece 170 as long as the upper pedestal 140 can be firmly and detachable assembled on the lower pedestal 130.

Definitely, in another embodiment, the upper pedestal 140 may not be detachably assembled on the lower pedestal 130 through the first magnetic piece 160 and the second magnetic piece 170. Other non-magnetic means of attraction, such as snapping can also be used, and the preset invention is not limited thereto.

To sum up, the limit ring and the pressing module of the rotating assembly in the present invention are confined in a tube body of the foot stand, the base is movably assembled with the limit ring, and a rotatable spherical friction part is disposed between the limit ring and the base. One side of the base is configured with the pressing module, and the base may be pushed to the direction of the limit ring by the pressing module to compress a space between the limit ring and the base so that the spherical friction part is in contact with an inner wall of the limit ring and an inner wall of the base, thereby providing the friction between the spherical friction part and the limit ring and the friction between the spherical friction part and the base. Therefore, an object connected to the spherical friction part can be temporarily fixed at a specific angle by the friction between the spherical friction part and the limit ring and the friction between the spherical friction part and the base. When the object needs to rotate, a user only needs to apply a force to overcome the foregoing friction. Therefore, the spherical friction part can rotate relative to the limit ring and the base. Furthermore, the design of the spherical friction part and the pressing module omit a complicated lock torque structure, which makes the structure more simple, space saving and beautiful. In addition, the foot stand of the present invention can be fastened on the wall surface, and a drive is hidden in the upper pedestal and the lower pedestal of the foot stand, which makes the appearance of the universal ball joint assembly in the present invention simpler.

Although the present invention has been disclosed in the above embodiments, the embodiments are not intended to limit the present invention. Any person with general knowledge in the technical field of the present invention can make some changes and modifications without departing from the spirit and scope of the present invention. Therefore, the protection scope of the present invention shall be subject to the appended claims.

What is claimed is:

1. A rotating assembly, adapted to be assembled on a foot stand, wherein the rotating assembly comprises:
    a limit ring, adapted to be fixed on the foot stand;
    a base, assembled on the limit ring and capable of moving along an axis, wherein the base and the limit ring form a space;
    a spherical friction part, rotatably disposed in the space between the limit ring and the base; and
    a pressing module, adapted to be fixed on the foot stand, wherein the pressing module is assembled on one side of the base along the axis, and pushes the base to a direction towards the limit ring to compress the space formed by the base and the limit ring so the spherical friction part is in contact with the limit ring and the base to generate friction, and the spherical friction part is temporarily maintained at a specific angle due to the friction between the spherical friction part and the limit ring and the friction between the spherical friction part and the base,
    wherein the pressing module comprises:
        a pressing part, adapted to be fixed on the foot stand, wherein the base is located between the pressing part and the spherical friction part; and
        an elastic part, disposed between the base and the pressing part,
    wherein the foot stand comprises a tube body and a plurality of first engaging portions protruding from an inner wall of the tube body, there is a plurality of notches among the first engaging portions, the pressing part further comprises a baseplate and a plurality of second engaging portions disposed on a part of an outer edge of the baseplate, and the pressing part is adapted to be limited by the first engaging portions after the second engaging portions pass through the notches and then rotates an angle to align the second engaging portions with the first engaging portions, and therefore to be fixed on the foot stand.

2. The rotating assembly according to claim 1, wherein the second engaging portions protrude from the baseplate and the elastic part is located in a space formed by the baseplate and the second engaging portions.

3. The rotating assembly according to claim 1, wherein the pressing part has an external thread, the foot stand has an internal thread corresponding to the external thread, and the pressing part is adjustably fixed on the foot stand.

4. The rotating assembly according to claim 1, further comprising:
    an assembly part, fixed on the spherical friction part and going through the limit ring.

5. The rotating assembly according to claim 1, wherein the spherical friction part comprises a sphere head and a contact layer wrapping the sphere head, and the contact layer is in contact with the limit ring and the base.

6. The rotating assembly according to claim 5, wherein the contact layer comprises a plurality of ribs or a plurality of bumps that protrudes from an outer surface of the contact layer and is uniformly distributed.

7. A universal ball joint assembly, adapted to assemble with an object, comprising:
    a foot stand, and
    a rotating assembly according to claim 1, wherein the limit ring and the pressing module are fixed on the foot stand.

8. The universal ball joint assembly according to claim 7, wherein the foot stand comprises a lower pedestal, an upper pedestal, a first magnetic piece, and a second magnetic piece corresponding to the first magnetic piece, the first magnetic piece is disposed on the upper pedestal, the second magnetic piece is disposed on the lower pedestal, and the upper pedestal is detachably assembled on the lower pedestal by the first magnetic piece and the second magnetic piece.

9. The universal ball joint assembly according to claim 7, wherein the foot stand comprises a lower pedestal and an upper pedestal, the lower pedestal comprises a first fastening portion, the upper pedestal comprises a second fastening portion corresponding to the first fastening portion, and the upper pedestal is detachably assembled on the lower pedestal by the first fastening portion and the second fastening portion.

* * * * *